United States Patent
Rinck

[11] 3,722,361
[45] Mar. 27, 1973

[54] UNIVERSAL MILLING SPINDLE-CARRYING UNIT

[75] Inventor: Albert Rinck, Viuz en Sallaz, France

[73] Assignee: Societe Anonyme Gambin S. A., Viuz en Sallaz, France

[22] Filed: June 28, 1971

[21] Appl. No.: 157,385

[30] Foreign Application Priority Data

July 16, 1970 France..............................7026103

[52] U.S. Cl..................................90/17, 90/11 A
[51] Int. Cl...............................B23c 1/12
[58] Field of Search.....................90/11 R, 11 A, 17

[56] References Cited

UNITED STATES PATENTS 973,695   10/1910   Philibert...................................90/17

FOREIGN PATENTS OR APPLICATIONS 680,975   2/1964   Canada...............................90/11 A Primary Examiner—Francis S. Husar
Attorney—Holman & Stern

[57] ABSTRACT

The invention relates to the universal milling units comprising a milling cutter-carrying spindle mounted in a head adapted to pivot in a fork-portion of a cylindrical body pivotally and longitudinally slidable in a bore of a support. The drive for rotating the milling cutter-carrying spindle is ensured from a power shaft coaxial with said body through a transmission which comprises, among others, a bevel gear secured to the milling cutter-carrying spindle and in mesh with a mating bevel gear which is carried by an intermediate shaft coaxial with the pivotal axis of the head.

In a known embodiment of this kind, the aforesaid transmission comprises an intermediate longitudinal shaft one end of which is operatively connected to the aforesaid mating bevel gear through a pair of bevel gears and the other end of which is operatively connected to the power shaft through a pair of cylindrical gears.

In order to avoid the detrimental effects of any torsion to which the intermediate longitudinal shaft is subjected, and also to avoid providing gears of relatively small dimensions such as the gears carried by the longitudinal intermediate shaft, a new structure is proposed in which such intermediate longitudinal shaft is eliminated. For this purpose, the remainder of the aforesaid transmission is constituted solely by a train of cylindrical meshing gears, the first of which is secured to a bevel gear in mesh with a bevel gear secured to the power shaft and the last of which is secured to the aforesaid mating bevel gear in mesh with the bevel gear secured to the milling cutter-carrying spindle.

3 Claims, 3 Drawing Figures

UNIVERSAL MILLING SPINDLE-CARRYING UNIT

This invention relates to the universal milling units adapted to be mounted in a support constituted by the frame of a milling machine or the frame of a machining center or else an attachment head for a machine-tool.

It relates more particularly to the units of the type in which the milling cutter-carrying spindle is mounted in a head which is adapted to pivot on an axis at right angles to the axis of the spindle between the cheeks of a fork formed in the outer fore end portion of a cylindrical body, the drive for rotating the milling cutter-carrying spindle being ensured from a power shaft coaxial with said body through a transmission which comprises, among others, a bevel gear secured to the milling cutter-carrying spindle in mesh with a mating bevel gear which is carried by an intermediate shaft coaxial with the pivotal axis of the head.

In a known embodiment of this kind, the aforesaid transmission comprises an intermediate longitudinal shaft one end of which is operatively connected to the aforesaid mating bevel gear through a pair of bevel gears and the other end of which is operatively connected to the power shaft through a pair of cylindrical gears.

Now, this arrangement has some drawbacks. Actually, the space available within the cylindrical body and particularly in a cheek which constitutes one of the elements of the fork of said body is very small, so that the bevel gear and the cylindrical gear secured to the intermediate shaft can have only small diameters and, therefore, are somewhat weak; further more the aforesaid intermediate longitudinal shaft is subjected to a relatively great torsion. Moreover, this arrangement makes it necessary for the gear secured to the spindle to have a relatively small diameter, which does not allow the ratio of reducing gearing between the motor shaft and the spindle to be as great as desirable.

The aim of the invention is to obtain a transmission of a new concept which does not have the aforesaid drawbacks of the conventional transmission just referred to above.

To this aim, according to the invention, the remainder of the aforesaid transmission is constituted solely by a train of cylindrical meshing gears the first of which is secured to a bevel gear in mesh with a bevel gear secured to the power shaft and the last of which is secured to the aforesaid mating bevel gear in mesh with the bevel gear secured to the milling cutter-carrying spindle.

By virtue of this particular structure, the longitudinal intermediate shaft of the conventional embodiment is dispensed with, therefore any possible torsion of such shaft is eliminated. The cylindrical and bevel gears which are to be secured to each other may be cut out of a single block in order not to be subjected to any possible torsion effect. Furthermore, the conventional embodiment comprises two pairs of bevel gears in the vicinity of the end of the unit, that is to say in the most encumbered portion of the latter, whereas in the arrangement according to the invention, one of these pairs of bevel gears is eliminated and replaced by a single cylindrical gear which, of course, requires less room so that it is possible particularly, to increase the diameter of the bevel gears secured to the spindle and, therefore, to increase the ratio of reducing gearing of the drive. Obviously, the new arrangement proposed necessitates providing a pair of bevel gears driven by the motor shaft, however, this has no drawback because much more room is available in this portion of the device than in the portion thereof where is mounted the pivoting head which supports the milling cutter-carrying spindle.

One embodiment of the invention will now be described by way of example with reference to the accompanying drawings, in which.

Figure 1:
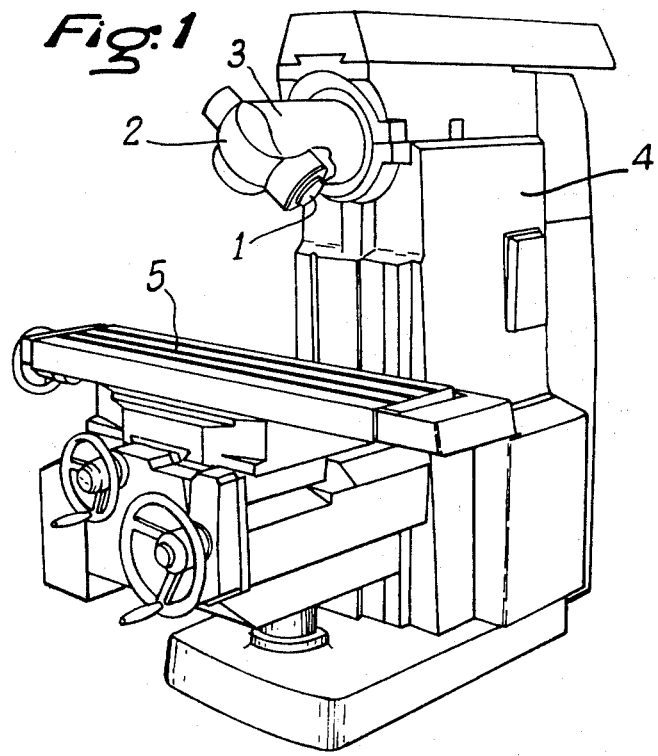
FIG. 1 is a perspective view of a universal milling machine embodying the invention.

The universal milling machine represented on FIG. 1 is of the type in which the milling cutter-carrying spindle is mounted in a head 2 adapted to pivot on an axis 2A at right angles, to the axis 1A of the spindle between the cheeks of a fork formed in the fore outer end of a body constituted by a cylindrical slide 3 horizontally mounted in overhanging condition in the upper part of the frame 4 of the machine, so as to be able to pivot on its own axis 3A and to slide in the frame. The workpiece-carrying table 5 is supported by a system of compound slides which is vertically movable and is no part of the invention.

Figure 2:
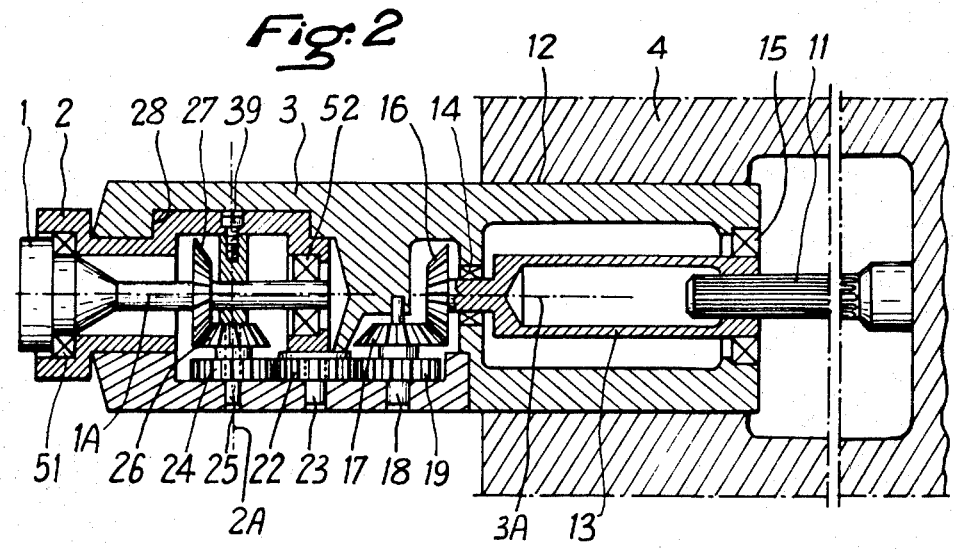
FIG. 2 is a section of the driving system for the milling cutter-carrying spindle mounted in the slide of the machine of FIG. 1.

FIG. 2 shows diagrammatically the system for rotatably driving the milling cutter-carrying spindle 1. It comprises a primary shaft 11 which is journalled in the upper part of the frame 4 of the machine, coaxially with the bore 12 containing the slide 3 and which is driven at any suitable speed from a motor through a transmission (not shown), a power shaft or follower shaft 13 journalled in bearings 14,15 of the slide coaxially therewith without any possible axial shifting relative thereto and which is coupled to the primary shaft 11 in rotational direction only, for instance by means of splines, a bevel gear 16 secured to the fore end of the power shaft 13, a bevel gear 17 in mesh with the bevel gear 16 and carried by a shaft 18 mounted in the slide 3 in a direction at right angles to the axis of the slide, a cylindrical gear 19 secured to the bevel gear 17, a cylindrical gear 22 in mesh with the cylindrical gear 19 and carried by a shaft 23 mounted in the slide in a direction parallel with the shaft 18, a cylindrical gear 24 in mesh with the cylindrical gear 22 and carried by an intermediate shaft 25 also mounted in the slide and parallel with the shafts 18 and 23, a bevel gear 26 secured to the cylindrical gear 24, and a bevel gear 27 secured to the milling cutter-carrying spindle 1 and in mesh with the bevel gear 26. The shaft 25 is coaxial with the cylindrical recess 28 in the slide 3 wherein the head 2 is pivotally mounted.

For the sake of clarity, in the claims of this application, the bevel gears 27,26,16 and 17 will be called, first, second, third and fourth bevel gears, respectively.

Figure 3:
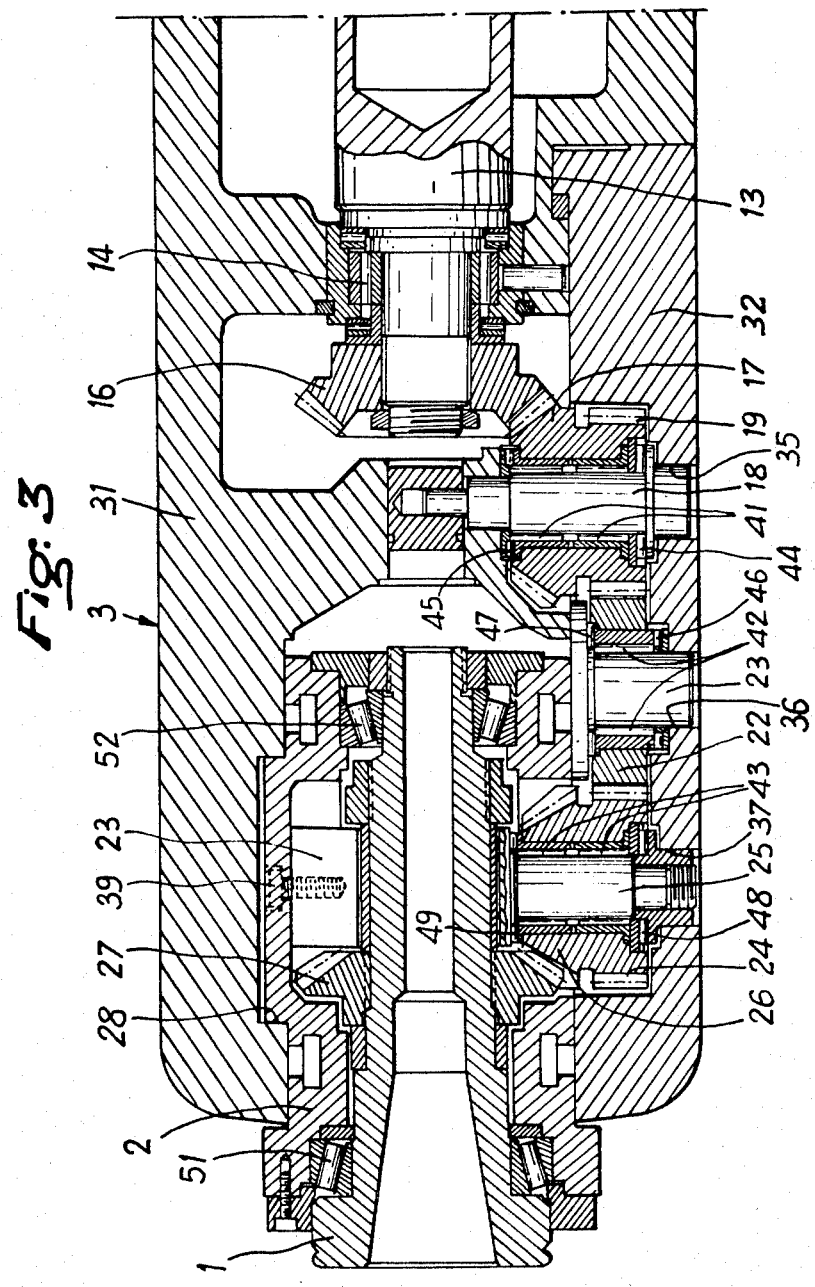
FIG. 3 is a longitudinal section of the main part of FIG. 2, on a larger scale.

FIG. 3 shows one embodiment of the structure diagrammatically represented in FIG. 2. The slide 3 is constituted by a body 31 on which is secured a cheek 32 the end of which forms, together with the end of the body 31, a fork in which the head 2 is pivotally mounted. All three shafts 18,23 and 25 are stationary shafts on which the gears carried thereby are loosely mounted. The outer ends of these three shafts bear in corresponding recesses 35, 36, 37 respectively in the cheek 32. The inner ends of the first two shafts 18 and 23 bear respectively against the body 31 and in the cheek 32, whereas the inner end of the third shaft 25 is in fork-like shape the two legs of which extend on either side of the milling cutter-carrying spindle 1 and are secured in the pivoting head 2, for instance by means of screws such as 39.

All three cylindrical gears 19, 22 and 24 rotate loosely on their shafts through needle bearings 41, 42, 43, respectively. They are axially positioned on their shafts by means of axial thrust needle bearings 44 and 45, 46 and 47, 48 and 49, respectively.

The cylindrical gear 19 and the bevel gear 17 are cut out of a single block as well as the cylindrical gear 24 and the bevel gear 26.

The pivoting head 2 will not be described in detail; it is of a conventional structure and supports the milling cutter-carrying spindle 1 through two roller bearings 51,52.

It may be ascertained that the whole of this transmission comprises no shaft liable to be subjected to the least torsion, that all the gears may have relatively large diameters and, therefore, may be rugged transmission members, and that the bevel gear 27 which is secured to the milling cutter-carrying spindle 1 may have a relatively large diameter since the portion of the slide in which it is mounted does not comprise two pairs of bevel gears as in the conventional arrangement, but the pair of bevel gears 26,27 and a single cylindrical gear 24; this enables increasing the whole ratio of reducing gearing of the transmission and, therefore, transmitting heavy torques to the milling cutter-carrying spindle without it being necessary to increase the size of all the intermediate elements in the transmission for driving said spindle.

What I claim is:

1. A universal milling unit comprising: a cylindrical body with a fork formed at one end of said body, a head mounted for pivotal movement in said fork on an axis at right angles to the axis of said cylindrical body, a tool-carrying spindle rotatably mounted in said head on an axis at right angles to the pivotal axis of said head, a power shaft coaxially mounted in the other end of said cylindrical body, and a transmission between said tool-carrying spindle and said power shaft; said transmission comprising: a first bevel gear secured to said tool-carrying spindle, a second bevel gear rotatably mounted in said cylindrical body on said pivotal axis of said head and in mesh with said first bevel gear, a bevel gear secured to said power shaft, a fourth bevel gear rotatably mounted in said cylindrical body on an axis parallel with the axis of said second bevel gear and in mesh with said bevel gear, and a train of cylindrical gears successively in mesh with one another, the first of said cylindrical gears being secured to said second bevel gear while the last of said cylindrical gears is secured to said fourth bevel gear.

2. A universal milling unit as defined in claim 1, wherein said train of cylindrical gears comprises a single intermediate gear between the first and the last.

3. The combination of, machining center, or attachment head for a machine-tool and a universal milling unit as defined in claim 1.

* * * * *